(12) United States Patent
Sugihara

(10) Patent No.: US 10,221,306 B2
(45) Date of Patent: Mar. 5, 2019

(54) RUBBER COMPOSITION FOR HOSE, AND HOSE

(71) Applicant: The Yokohama Rubber Co., LTD., Minato-ku, Tokyo (JP)

(72) Inventor: Koki Sugihara, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/710,664

(22) Filed: Sep. 20, 2017

(65) Prior Publication Data

US 2018/0105686 A1 Apr. 19, 2018

(30) Foreign Application Priority Data

Oct. 18, 2016 (JP) ................................ 2016-204219

(51) Int. Cl.
| | |
|---|---|
| *C08L 23/08* | (2006.01) |
| *C08K 5/37* | (2006.01) |
| *C08K 3/02* | (2006.01) |
| *F16L 11/08* | (2006.01) |
| *C08L 23/16* | (2006.01) |
| *F16L 11/04* | (2006.01) |

(52) U.S. Cl.
CPC ............. *C08L 23/16* (2013.01); *C08K 3/02* (2013.01); *C08K 5/37* (2013.01); *C08L 23/08* (2013.01); *C08L 23/0815* (2013.01); *C08L 2205/02* (2013.01); *F16L 11/04* (2013.01); *F16L 11/085* (2013.01)

(58) Field of Classification Search
None
See application file for complete search history.

(56) References Cited

U.S. PATENT DOCUMENTS

| | | | | |
|---|---|---|---|---|
| 4,433,073 | A * | 2/1984 | Sano | C08L 21/00 523/201 |
| 4,634,740 | A * | 1/1987 | Fujita | C08F 210/16 525/240 |
| 5,116,908 | A * | 5/1992 | Inoue | C08F 255/02 525/193 |
| 2017/0203923 | A1 | 7/2017 | Zou | |

FOREIGN PATENT DOCUMENTS

| | | | |
|---|---|---|---|
| JP | 2016-030761 | 3/2016 | |
| WO | WO 2016/013486 | 1/2016 | |
| WO | WO-2016013486 A1 * | 1/2016 | ............... C08K 5/14 |

* cited by examiner

*Primary Examiner* — Christopher M Rodd

(74) *Attorney, Agent, or Firm* — Thorpe North & Western

(57) ABSTRACT

A rubber composition for a hose of the present technology contains: an ethylene-propylene copolymer having an ethylene content of 40 mass % or greater but less than 60 mass %; an ethylene-1-butene copolymer; and carbon black having a nitrogen adsorption specific surface area of 17 to 52 $m^2/g$; a mass ratio of the ethylene-1-butene copolymer to the ethylene-propylene copolymer (ethylene-1-butene copolymer/ethylene-propylene copolymer) being from 10/90 to 90/10.

7 Claims, 1 Drawing Sheet

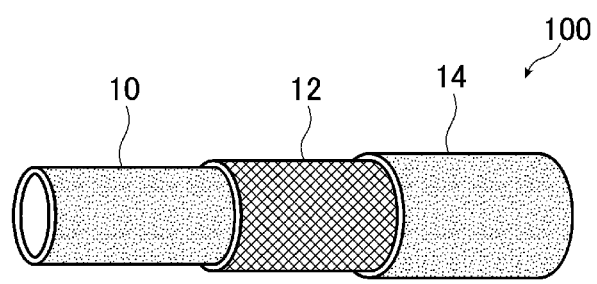

RUBBER COMPOSITION FOR HOSE, AND HOSE

PRIORITY CLAIM

Priority is claimed to Japan Patent Application Serial No. 2016-204219 filed on Oct. 18, 2016.

TECHNICAL FIELD

The present technology relates to a rubber composition for a hose, and a hose.

BACKGROUND ART

In recent years, engines have been made smaller to enhance fuel economy of automobiles, and along with this, automobiles having an engine to which a supercharger (turbo) is introduced are becoming more popular. Due to the introduction of the supercharger, the temperature around an engine is increased, and highly heat resistant hoses have been increasingly demanded as radiator hoses, air conditioner hoses, or the like.

Meanwhile, as a rubber composition having heat resistance, for example, Japanese Unexamined Patent Application Publication No. 2016-030761 is proposed.

Japanese Unexamined Patent Application Publication No. 2016-030761 describes
a rubber composition for a heat-resistant conveyor belt including:
an ethylene-1-butene copolymer having a Mooney viscosity at 125° C. of 20 or greater; and
an ethylene-propylene copolymer having a Mooney viscosity at 125° C. of 20 or greater and an ethylene content of 40 to 60 mass %;
a mass ratio of the ethylene-1-butene copolymer to the ethylene-propylene copolymer being from 10/90 to 90/10.

In such circumstances, when the inventors of the present technology prepared a rubber composition using Japanese Unexamined Patent Application Publication No. 2016-030761 as a reference and evaluated this, it was found that such a rubber composition may not satisfy heat resistance that has been required for air conditioner hoses for automobiles, and that the adhesion to reinforcing yarn may be low.

SUMMARY

The present technology provides a rubber composition for a hose having excellent heat resistance and excellent adhesion to reinforcing yarn.

Another object of the present technology is to provide a hose.

As a result of diligent research to solve the problems described above, the inventors of the present technology found that predetermined effects can be achieved by setting the nitrogen adsorption specific surface area of the carbon black to be within a particular range.

The present technology is based on the findings described above and specifically solves the problems described above by the following features.

1. A rubber composition for a hose containing:
an ethylene-propylene copolymer having an ethylene content of 40 mass % or greater but less than 60 mass %;
an ethylene-1-butene copolymer; and
carbon black having a nitrogen adsorption specific surface area of 17 to 52 $m^2/g$;
a mass ratio of the ethylene-1-butene copolymer to the ethylene-propylene copolymer (ethylene-1-butene copolymer/ethylene-propylene copolymer) being from 10/90 to 90/10.

2. A rubber composition for a hose according to 1 above, where a content of the carbon black is from 55 to 130 parts by mass per 100 parts by mass total of the ethylene-propylene copolymer and the ethylene-1-butene copolymer.

3. The rubber composition for a hose according to 1 or 2 above, further containing an anti-aging agent having a mercapto group.

4. A hose containing an outermost layer formed with the rubber composition for a hose described in any one of 1 to 3 above.

5. The hose according to 4 above, where the hose has a reinforcing layer arranged on an inner side of the outermost layer, and the reinforcing layer is a fiber reinforcing layer in which reinforcing yarn is braided into a spiral structure and/or a braid structure.

6. The hose according to 4 or 5 above, where the hose is an air conditioner hose for an automobile.

The rubber composition for a hose of the present technology achieves excellent heat resistance and excellent adhesion to reinforcing yarn.

The hose of the present technology achieves excellent heat resistance and excellent adhesion to reinforcing yarn.

BRIEF DESCRIPTION OF DRAWING

FIG. 1 is a perspective view schematically illustrating a cut-away of each layer for an example of the hose of the present technology.

DETAILED DESCRIPTION

Embodiments of the present technology are described in detail below.

Note that, in the present specification, (meth)acryloyloxy refers to acryloyloxy or methacryloyloxy.

Furthermore, in the present specification, numerical ranges indicated using "(from) . . . to . . . " include the former number as the lower limit value and the later number as the upper limit value.

In the present specification, unless otherwise noted, each component may use one type of substance that corresponds to the component or may use a combination of two or more types of substances that correspond to the component. When a component contains two or more types of substances, the content of the component refers to the total content of the two or more types of substances.

In the present specification, "adhesion to reinforcing yarn" may simply referred to as "adhesion".

Rubber Composition for Hose

The rubber composition for a hose of the present technology (the rubber composition of the present technology) is a rubber composition for a hose containing:
an ethylene-propylene copolymer having an ethylene content of 40 mass % or greater but less than 60 mass %;
an ethylene-1-butene copolymer; and
carbon black having a nitrogen adsorption specific surface area of 17 to 52 $m^2/g$;
a mass ratio of the ethylene-1-butene copolymer to the ethylene-propylene copolymer (ethylene-1-butene copolymer/ethylene-propylene copolymer) being from 10/90 to 90/10.

The rubber composition of the present technology is thought to achieve desired effects as a result of having such a configuration. Although the reason for this is unknown, regarding heat resistance, the reason is presumed to be as follows.

In the present technology, by setting a nitrogen adsorption specific surface area of carbon black to be within a predetermined range, in high temperature conditions, activity of the carbon black becomes lower than that of carbon black having a nitrogen adsorption specific surface area that is greater than the predetermined range. For this reason, the interaction between the carbon black and the ethylene-propylene copolymer or ethylene-1-butene copolymer tends to be maintained even in high temperature conditions, and thus excellent heat resistance of the rubber composition of the present technology is achieved.

Each of the components contained in the rubber composition of the present technology will be described in detail below.

Ethylene-propylene Copolymer

The ethylene-propylene copolymer (EPM) contained in the rubber composition of the present technology is a copolymer of ethylene and propylene, and the content of repeating units of ethylene (ethylene content) contained in the ethylene-propylene copolymer is 40 mass % or greater but less than 60 mass % relative to the total amount of the ethylene-propylene copolymer.

From the perspective of achieving even better heat resistance, the ethylene content is preferably from 40 to 60 mass %, and more preferably from 50 to 60 mass %, relative to the total amount of the ethylene-propylene copolymer.

The method of producing the ethylene-propylene copolymer is not particularly limited. Examples thereof include conventionally known methods.

Ethylene-1-butene Copolymer

The ethylene-1-butene copolymer (EBM) contained in the rubber composition of the present technology is a copolymer of ethylene and 1-butene.

From the perspective of achieving even better heat resistance, the content of repeating units of ethylene (ethylene content) contained in the ethylene-1-butene copolymer is preferably from 30 to 90 mass %, and more preferably from 60 to 90 mass %, relative to the total amount of the ethylene-1-butene copolymer.

The method of producing the ethylene-1-butene copolymer is not particularly limited. Examples thereof include conventionally known methods. Mass ratio of ethylene-1-butene copolymer to ethylene-propylene copolymer In the present technology, the mass ratio of the ethylene-1-butene copolymer to the ethylene-propylene copolymer (ethylene-1-butene copolymer/ethylene-propylene copolymer) is from 10/90 to 90/10. By setting the mass ratio to be within the range described above, the present technology achieves excellent heat resistance and processability.

From the perspective of achieving even better heat resistance, the mass ratio is preferably from 15/85 to 85/15, and more preferably from 30/70 to 70/30.

Carbon Black

The rubber composition of the present technology contains carbon black having a nitrogen adsorption specific surface area of 17 to 52 m$^2$/g. Since the carbon black contained in the present technology is the soft carbon having a nitrogen adsorption specific surface area described above, the rubber composition of the present technology achieves excellent heat resistance and adhesion.

Nitrogen Adsorption Specific Surface Area of Carbon Black

The nitrogen adsorption specific surface area ($N_2SA$) of the carbon black is preferably from 20 to 30 m$^2$/g from the perspective of achieving even better heat resistance.

In the present technology, the nitrogen adsorption specific surface area of carbon black was measured in accordance with JIS (Japanese Industrial Standard) K 6217-2.

Type of Carbon Black

Examples of the carbon black include fast extruding furnace (FEF) carbon black, general purpose furnace (GPF) carbon black, and semi-reinforcing furnace (SRF) carbon black.

Among these, from the perspective of achieving even better heat resistance and adhesion, SRF carbon black is preferred.

From the perspective of achieving even better heat resistance and adhesion, the content of the carbon black is preferably from 55 to 130 parts by mass, and more preferably from 70 to 110 parts by mass, per 100 parts by mass total of the ethylene-propylene copolymer and the ethylene-1-butene copolymer.

Additives

The rubber composition of the present technology may further contain additives as necessary within a scope that does not inhibit the effect of the present technology.

Examples of the additive include rubbers except the EPM and the EBM described above, reinforcing agents except the carbon black described above, crosslinking agent (e.g. peroxides and co-crosslinking agents), acid acceptors, processing aids, vulcanizing agents except the crosslinking agents (e.g. thiourea-based vulcanizing agents and amine-based vulcanizing agents), vulcanization accelerator aids (e.g. zinc oxide and stearic acid), anti-aging agents, and plasticizers.

Anti-Aging Agents

An example of a preferable aspect is one in which the rubber composition of the present technology further contains an anti-aging agent. The anti-aging agent is not particularly limited. Examples thereof include amine-based anti-aging agents and sulfur-containing anti-aging agents.

Among these, from the perspective of achieving even better heat resistance, an anti-aging agent having a mercapto group is preferred.

Anti-Aging Agent Having Mercapto Group

Examples of the anti-aging agent having a mercapto group include 2-mercaptomethylbenzimidazole and 2-mercaptobenzimidazole.

The content of the anti-aging agent (total content) contained in the rubber composition of the present technology is preferably from 5 to 15 parts by mass, and more preferably from 5 to 10 parts by mass, per 100 parts by mass total of the ethylene-propylene copolymer and the ethylene-1-butene copolymer.

When an anti-aging agent having a mercapto group is contained as the anti-aging agent, the content of the anti-aging agent having a mercapto group is preferably from 1 to 10 parts by mass, and more preferably from 3 to 8 parts by mass, per 100 parts by mass total of the ethylene-propylene copolymer and the ethylene-1-butene copolymer from the perspective of achieving even better heat resistance and even better adhesion.

When the anti-aging agent having a mercapto group is used together with another anti-aging agent, the other anti-aging agent as the anti-aging agent is not particularly limited. Examples thereof include organic substances such as styrenated diphenylamine. The other anti-aging agent may be a mixture of the organic substance described above and an inert filler.

Peroxide

An example of a preferable aspect is one in which the rubber composition of the present technology further contains peroxide.

The peroxide is not particularly limited. Examples thereof include peroxide that is ordinarily used in crosslinking of rubbers. Specific examples thereof include organic peroxides, such as dicumyl peroxide, di-tert-butyl peroxide, bis (t-butylperoxyisopropyl)benzene, n-butyl 4,4'-di(t-butylperoxy)valerate, and 2,5-dimethyl-2,5-di(t-butylperoxy) hexane.

The content of the peroxide is preferably from 4 to 10 parts by mass, and more preferably from 5 to 7 parts by mass, per 100 parts by mass total of the ethylene-propylene copolymer and the ethylene-1-butene copolymer.

Co-Crosslinking Agent

When the rubber composition of the present technology further contains peroxide, an example of a preferable aspect is one in which the rubber composition further contains a co-crosslinking agent.

Examples of the co-crosslinking agent include compounds having a plurality of epoxy groups or ethylenically unsaturated bonds.

Specific examples thereof include compounds having a plurality of (meth)acryloyloxy groups, such as magnesium dimethacrylate; and compounds having a plurality of allyl groups, such as triallyl isocyanurate and diallyl phthalate.

From the perspectives of achieving even better heat resistance and/or adhesion and achieving high physical properties, the content of the co-crosslinking agent is preferably from 1 to 10 parts by mass, and more preferably from 1 to 5 parts by mass, per 100 parts by mass total of the ethylene-propylene copolymer and the ethylene-1-butene copolymer.

Method of Producing Rubber Composition

The method of producing the rubber composition of the present technology is not particularly limited. For example, the rubber composition of the present technology can be produced by mixing the ethylene-propylene copolymer, the ethylene-1-butene copolymer, the carbon black, and additives that may be used as necessary in a condition at 100 to 180° C.

Vulcanization of Rubber Composition (Crosslinking)

The method of vulcanizing (crosslinking) the rubber composition of the present technology is not particularly limited. Examples thereof include a vulcanization (crosslinking) method in which the rubber composition of the present technology is subjected to press vulcanization, steam vulcanization, oven vulcanization (hot-air vulcanization), or hot water vulcanization in a condition at 140 to 190° C.

Application

The rubber composition of the present technology can be used for hoses. In particular, the rubber composition can be suitably used for air conditioner hoses for automobiles.

Reinforcing Yarn

The reinforcing yarn that can be applied to the rubber composition of the present technology is not particularly limited as long as the reinforcing yarn is fiber yarn having reinforcing properties.

Examples of materials for reinforcing yarn include polyester, polyethylene terephthalate, and polyethylene naphthalate.

Reinforcing yarn may be, for example, twisted yarn.

The method of producing the reinforcing yarn is not particularly limited. Examples thereof include conventionally known methods.

A fiber reinforcing layer can be produced by using the reinforcing yarn. Such a fiber reinforcing layer can be used as the reinforcing layer for a hose. Examples of the fiber reinforcing layer include a fiber reinforcing layer in which reinforcing yarn is braided into a spiral structure and/or a braid structure.

The method of producing the fiber reinforcing layer is not particularly limited. Examples thereof include conventionally known methods.

Hose

The hose of the present technology is a hose having an outermost layer which is formed by using the rubber composition for a hose of the present technology.

The rubber composition constituting the outermost layer is not particularly limited as long as the rubber composition is the rubber composition of the present technology.

Reinforcing Layer

An example of a preferable aspect is one in which the hose of the present technology further has a reinforcing layer. The reinforcing layer is preferably the fiber reinforcing layer described above.

The reinforcing layer needs to be arranged at an inner side position than the outermost layer. From the perspective of achieving even better adhesion, the reinforcing layer is preferably located adjacent to the outermost layer.

From the perspective of achieving at least one type selected from the group consisting of excellent pressure resistance and excellent structural stability, the reinforcing layer is preferably a fiber reinforcing layer in which reinforcing yarn is braided into a spiral structure and/or a braid structure.

The reinforcing layer and the fiber reinforcing layer are the same as those described above.

The hose of the present technology may further contain an inner layer.

The rubber composition constituting the inner layer is not particularly limited. For example, the inner layer may be formed with the rubber composition of the present technology.

An example of a preferable aspect is one in which the hose of the present technology has the inner layer, the reinforcing layer, and the outermost layer in this order.

A plurality of the inner layers may be employed. When a plurality of inner layers is employed, at least one layer of the plurality of inner layers may serve as a gas barrier layer. The composition constituting the gas barrier layer is not particularly limited. Examples thereof include conventionally known compositions.

When a plurality of the inner layers is employed, a reinforcing layer may be arranged in between adjacent inner layers.

The hose of the present technology will be described while referring to the attached drawings. However, the present technology is not limited to the attached drawings.

FIG. 1 is a perspective view schematically illustrating a cut-away of each layer for an example of the hose of the present technology.

In FIG. 1, a hose 100 has an inner layer 10, a reinforcing layer 12, and an outermost layer 14. The outermost layer 14 is formed with the rubber composition of the present technology. The reinforcing layer 12 is preferably a fiber reinforcing layer.

The method of producing the hose of the present technology is not particularly limited. Examples thereof include a production method in which a rubber composition for forming an inner layer, a reinforcing layer and a rubber composition (rubber composition of the present technology) for forming an outermost layer are laminated on a mandrel in this order, and the obtained laminate is vulcanization bonded by subjecting the laminate to press vulcanization, steam vulcanization, oven vulcanization (hot-air vulcanization), or hot water vulcanization in a condition at 140 to 190° C. for 30 to 180 minutes.

Examples of the application of the hose of the present technology include air conditioner hoses, power steering hoses, and hydraulic hoses. An example of a preferable aspect is an air conditioner hose for an automobile.

EXAMPLES

The present technology is described below in detail using examples but the present technology is not limited to such examples.

Production of Rubber Composition

The components shown in Table 1 below were used in compositions (part by mass) shown in the same table and mixed by an agitator to produce a rubber composition.

Specifically, a master batch was obtained by first kneading the components shown in Table 1 below, except crosslinking agents 1 to 4, for 5 minutes in a Banbury mixer (3.4 L), and then discharging the kneaded product when the temperature reached 160° C. A rubber composition was obtained by kneading the obtained master batch with the crosslinking agents 1 to 4 with an open roll.

Evaluation

The following evaluations were performed using the rubber compositions produced as described above. The results are shown in Table 1.

Production of Vulcanized Sheet and Test Piece Used in Tensile Test

Using a 150° C. press molding machine, each of the obtained rubber compositions was vulcanized for 45 minutes under a surface pressure of 3.0 MPa to produce a vulcanized sheet having a thickness of 2 mm.

A JIS No. 3 dumbbell-shaped test piece was punched out from the vulcanized sheet produced as described above. Tensile test was performed using the test piece.

Evaluation of Physical Properties in Normal State

Tensile Test (Tensile Strength and Elongation at Break)

Using the test piece described above, tensile test was performed at a tensile test speed of 500 mm/min in accordance with JIS K6251:2010, and tensile strength (TB) [MPa] and elongation at break (EB) [%] as physical properties in normal state were measured in a condition at 23° C.±2° C.

Hardness

Hardness measurement test was performed using a type A durometer in accordance with JIS K 6253-3 in a condition at 23° C. by stacking three sheets of the vulcanized sheets produced as described above to measure the hardness in a condition at 23° C.±2° C.

Physical Properties After Aging

Aging Test

Aging test was performed by leaving the test piece described above or the three sheets of stacked vulcanized sheets produced for the hardness measurement described above in a condition at 180° C. for 336 hours.

Measurement of Physical Properties After Aging Test

Tensile strength, elongation at break, and hardness were measured in a condition at 23° C.±2° C. using the test piece or the three sheets of stacked vulcanized sheets after the aging test, in the same manner as for "Evaluation of physical properties in normal state".

Evaluation of Physical Properties After Aging $\Delta TB$

Rate of change of the tensile strength ($\Delta TB$; unit: %) was determined by substituting the tensile strengths before and after the aging test into the following equation. A smaller absolute value of $\Delta TB$ indicates superior heat resistance.

Rate of change ($\Delta TB$; unit: %)={(($TB$ after aging test)−($TB$ of physical properties in normal state))/($TB$ of physical properties in normal state)}×100

$\Delta EB$

For the elongation at break, $\Delta EB$ was determined in the same manner. A smaller absolute value of $\Delta EB$ indicates superior heat resistance.

$\Delta HS$

For the hardness, $\Delta HS$ was determined in the same manner. A smaller absolute value of $\Delta HS$ indicates superior heat resistance.

Adhesion

Production of Hose-Like Test Piece

First, a reinforcing layer (a fiber reinforcing layer) was formed by winding reinforcing yarn (polyester cord) and braiding it into a spiral structure on an iron mandrel having an outer diameter of 25 mm. Thereafter, on the reinforcing layer, an unvulcanized sheet having a thickness of 2.5 mm prepared by each of the rubber compositions produced as described above was adhered and vulcanized in a condition at 157° C. for 60 minutes to produce a hose-like test piece having a fiber reinforcing layer and a rubber layer.

Peeling Test

Using each of the hose-like test pieces produced as described above, peeling test was performed by peeling off the rubber layer having a width of 25 mm from the hose-like test piece at a peeling rate of 50 mm/min in a condition at room temperature to measure the adhesive strength per 25 mm width.

The average value of values (kN/m) obtained by multiplying each of the adhesive strength per 25 mm width obtained as described above by 40 is shown in the row of "peel strength" of Table 1.

Note that the number of samples of each of the hose-like test piece used for the measurement was 2.

TABLE 1

|  |  | Working Examples | | | | |
| --- | --- | --- | --- | --- | --- | --- |
|  |  | 1 | 2 | 3 | 4 | 5 |
| Composition | EPM | 60.00 | 60.00 | 60.00 | 60.00 | 60.00 |
|  | EBM | 40.00 | 40.00 | 40.00 | 40.00 | 40.00 |

TABLE 1-continued

|  |  | | | | | |
|---|---|---|---|---|---|---|
| | Carbon 1 N220 (comparison) | | | | | |
| | Carbon 2 N550 | | | | | |
| | Carbon 3 N770 | 80.00 | 90.00 | 100.00 | 80.00 | 80.00 |
| | Zinc oxide | 5.00 | 5.00 | 5.00 | 5.00 | 5.00 |
| | Stearic acid | 1.00 | 1.00 | 1.00 | 1.00 | 1.00 |
| | Anti-aging agent 1 | 6.00 | 6.00 | 6.00 | 6.00 | 6.00 |
| | Anti-aging agent 2 | 3.00 | 3.00 | 3.00 | 3.00 | 3.00 |
| | Plasticizer | 14.00 | 14.00 | 14.00 | 14.00 | 14.00 |
| | Crosslinking agent 1 | 5.50 | 5.50 | 5.50 | 5.50 | 5.50 |
| | Crosslinking agent 2 | 3.00 | 3.00 | 3.00 | | |
| | Crosslinking agent 3 | | | | 1.75 | 3.00 |
| | Crosslinking agent 4 | | | | | |
| Physical properties in normal state | TB (normal state) MPa | 8.5 | 8.8 | 9.0 | 6.4 | 7.8 |
| | EB (normal state) % | 583 | 509 | 454 | 717 | 663 |
| | HS (normal state) pt | 68 | 71 | 73 | 70 | 67 |
| Physical properties after aging after 180° C. × 336 hr | ΔTB (aging) % | −42 | −45 | −46 | −27 | −23 |
| | ΔEB (aging) % | −48 | −46 | −53 | −52 | −50 |
| | ΔHS (aging) pt | +8 | +7 | +8 | +6 | +10 |
| Adhesion | Peeling strength kN/m n = 2 | 4.1 | 3.8 | 4.0 | 4.2 | 3.4 |

| | | Working Examples | | | |
|---|---|---|---|---|---|
| | | 6 | 7 | 8 | 9 |
| Composition | EPM | 60.00 | 60.00 | 60.00 | 40.00 |
| | EBM | 40.00 | 40.00 | 40.00 | 60.00 |
| | Carbon 1 N220 (comparison) | | | | |
| | Carbon 2 N550 | | | 90.00 | |
| | Carbon 3 N770 | 80.00 | 80.00 | | 90.00 |
| | Zinc oxide | 5.00 | 5.00 | 5.00 | 5.00 |
| | Stearic acid | 1.00 | 1.00 | 1.00 | 1.00 |
| | Anti-aging agent 1 | 6.00 | 6.00 | 6.00 | 6.00 |
| | Anti-aging agent 2 | 3.00 | 3.00 | 3.00 | 3.00 |
| | Plasticizer | 14.00 | 14.00 | 14.00 | 14.00 |
| | Crosslinking agent 1 | 5.50 | 5.50 | 5.50 | 5.50 |
| | Crosslinking agent 2 | | | 3.00 | 3.00 |
| | Crosslinking agent 3 | | | | |
| | Crosslinking agent 4 | 2.00 | 4.00 | | |
| Physical properties in normal state | TB (normal state) MPa | 5.8 | 6.5 | 9.0 | 8.3 |
| | EB (normal state) % | 861 | 864 | 460 | 500 |
| | HS (normal state) pt | 69 | 69 | 73 | 71 |
| Physical properties after aging after 180° C. × 336 hr | ΔTB (aging) % | −47 | −35 | −50 | −50 |
| | ΔEB (aging) % | −70 | −68 | −51 | −51 |
| | ΔHS (aging) pt | +6 | +6 | +8 | +8 |
| Adhesion | Peeling strength kN/m n = 2 | 4.2 | 4.9 | 3.6 | 3.6 |

| | | Comparative Examples | | |
|---|---|---|---|---|
| | | 1 | 2 | 3 |
| Composition | EPM | 60.00 | 100.00 | 100.00 |
| | EBM | 40.00 | | |
| | Carbon 1 N220 (comparison) | 50.00 | 50.00 | |
| | Carbon 2 N550 | | | |
| | Carbon 3 N770 | | | 80.00 |
| | Zinc oxide | 5.00 | 5.00 | 5.00 |
| | Stearic acid | 1.00 | 1.00 | 1.00 |
| | Anti-aging agent 1 | 6.00 | 6.00 | |
| | Anti-aging agent 2 | 3.00 | 2.00 | |
| | Plasticizer | 14.00 | 9.00 | 9.00 |
| | Crosslinking agent 1 | 5.50 | 5.50 | 5.50 |
| | Crosslinking agent 2 | 3.00 | 3.00 | 3.00 |
| | Crosslinking agent 3 | | | |
| | Crosslinking agent 4 | | | |
| Physical properties in normal state | TB (normal state) MPa | 12.0 | 10.9 | 11.8 |
| | EB (normal state) % | 672 | 544 | 362 |
| | HS (normal state) pt | 68 | 64 | 68 |
| Physical properties after aging after 180° C. × 336 hr | ΔTB (aging) % | −71 | −76 | −95 |
| | ΔEB (aging) % | −66 | −71 | −95 |
| | ΔHS (aging) pt | +9 | +10 | +20 |

TABLE 1-continued

| | | | | |
|---|---|---|---|---|
| Adhesion | Peeling strength kN/m n = 2 | 3.3 | 3.5 | 2.8 |

Details of the components described in Table 1 are as follows.

EPM: ethylene-propylene copolymer having the ethylene content of 52 mass %; trade name: KEP-110 (manufactured by Kumho Polychem)

EBM: ethylene-1-butene copolymer having the ethylene content of 74 mass %; trade name: Engage 7487 (manufactured by The Dow Chemical Company)

Carbon 1 N220 (comparison): carbon black; trade name: Show Black N220 (manufactured by Cabot Japan K.K.); nitrogen adsorption specific surface area: 115 $m^2/g$; ISAF carbon black Carbon 2 N550: carbon black; trade name: Niteron #10N (manufactured by NSCC Carbon Co., Ltd.); nitrogen adsorption specific surface area: 46 $m^2/g$; FEF carbon black Carbon 3 N770: carbon black; trade name: Asahi 50 (manufactured by Asahi Carbon Co., Ltd.); nitrogen adsorption specific surface area: 25 $m^2/g$; SRF carbon black Zinc oxide: trade name: Type III zinc oxide (manufactured by Seido Chemical Industry Co., Ltd.)

Stearic acid: trade name: stearic acid 50S (manufactured by Chiba Fatty Acid Co., Ltd.)

Anti-aging agent 1: trade name: NOCRAC MMB (manufactured by Ouchi Shinko Chemical Industrial Co., Ltd.); 2-mercaptomethylbenzimidazole Anti-aging agent 2: trade name: NONFLEX LAS-P (manufactured by Seiko Chemical Co., Ltd.); mixture of styrenated diphenylamine and inert filler.

Plasticizer: trade name: SUNPAR 2280 (manufactured by Japan Sun Oil Company, Ltd.)

Crosslinking agent 1: trade name: Perkadox 14-40 (manufactured by Kayaku Akzo Corporation); organic peroxide Crosslinking agent 2: magnesium dimethylacrylate; trade name: Hi-Cross GT (manufactured by Seiko Chemical Co., Ltd.); co-crosslinking agent Crosslinking agent 3: triallyl isocyanurate; trade name: TAIC (manufactured by Nippon Kasei Chemical Company Limited); co-crosslinking agent Crosslinking agent 4: diallyl phthalate; trade name: DAISO DAP Monomer, manufactured by Osaka Soda Co., Ltd., co-crosslinking agent As is clear from the results shown in Table 1, Comparative Example 1, which contained carbon black having the nitrogen adsorption specific surface area that is outside the predetermined range, had a large absolute value of ΔTB and exhibited low heat resistance. Furthermore, Comparative Example 1 resulted in small peel strength and low adhesion.

Comparative Example 2, which contained carbon black having the nitrogen adsorption specific surface area that is outside the predetermined range and contained no ethylene-1-butene copolymer, had large absolute values of ΔTB and ΔEB and exhibited low heat resistance.

Comparative Example 3, which contained no ethylene-1-butene copolymer, had large absolute values of ΔTB, ΔEB, and ΔHS and exhibited low heat resistance. Furthermore, Comparative Example 3 resulted in small peel strength and low adhesion.

On the other hand, the present technology exhibited excellent heat resistance and excellent adhesion to reinforcing yarn.

When Example 2 and Example 8 are compared, Example 2 which had the nitrogen adsorption specific surface area of the carbon black of 25 $m^2/g$ exhibited superior heat resistance and adhesion compared to those of Example 8 which had the nitrogen adsorption specific surface area of the carbon black of 46 $m^2/g$.

The invention claimed is:

1. A rubber composition for a hose comprising:
    an ethylene-propylene copolymer having an ethylene content of 40 mass % or greater but less than 60 mass %;
    an ethylene-1-butene copolymer; and
    carbon black having a nitrogen adsorption specific surface area of 17 to 52 $m^2/g$;
    a mass ratio of the ethylene-1-butene copolymer to the ethylene-propylene copolymer (ethylene-1-butene copolymer/ethylene-propylene copolymer) being from 10/90 to 90/10.

2. The rubber composition for a hose according to claim 1, wherein a content of the carbon black is from 55 to 130 parts by mass per 100 parts by mass total of the ethylene-propylene copolymer and the ethylene-1-butene copolymer.

3. The rubber composition for a hose according to claim 1, further comprising an anti-aging agent having a mercapto group.

4. The rubber composition for a hose according to claim 2, further comprising an anti-aging agent having a mercapto group.

5. A hose comprising an outermost layer formed with the rubber composition for a hose described in claim 1.

6. The hose according to claim 5, wherein the hose comprises a reinforcing layer arranged on an inner side of the outermost layer, and the reinforcing layer is a fiber reinforcing layer in which reinforcing yarn is braided into a spiral structure and/or a braid structure.

7. The hose according to claim 5, wherein the hose is an air conditioner hose for an automobile.

* * * * *